(12) United States Patent
Inou et al.

(10) Patent No.: US 8,280,588 B2
(45) Date of Patent: Oct. 2, 2012

(54) APPARATUS FOR TRAVEL SUPPORT

(75) Inventors: Hiroshi Inou, Anjo (JP); Mamoru Sawada, Yokkaichi (JP)

(73) Assignee: Denso Corporation, Kariya (JP)

( * ) Notice: Subject to any disclaimer, the term of this patent is extended or adjusted under 35 U.S.C. 154(b) by 545 days.

(21) Appl. No.: 12/462,416

(22) Filed: Aug. 4, 2009

(65) Prior Publication Data

US 2010/0036563 A1    Feb. 11, 2010

(30) Foreign Application Priority Data

Aug. 6, 2008 (JP) ................................ 2008-203410

(51) Int. Cl.
*G06F 7/00*    (2006.01)

(52) U.S. Cl. ............... 701/41; 701/42; 701/36; 701/300

(58) Field of Classification Search ............... 701/36, 701/41, 42, 93, 96, 300, 301, 514
See application file for complete search history.

(56) References Cited

U.S. PATENT DOCUMENTS

| 5,517,021 | A | * | 5/1996 | Kaufman et al. | ............. | 250/221 |
| 7,519,459 | B2 | | 4/2009 | Ito et al. | | |
| 7,577,504 | B2 | | 8/2009 | Sawada et al. | | |
| 7,616,782 | B2 | * | 11/2009 | Badawy | ........................ | 382/107 |
| 7,656,313 | B2 | * | 2/2010 | Victor et al. | ............. | 340/995.26 |
| 2005/0200088 | A1 | | 9/2005 | Sawada et al. | | |
| 2005/0209749 | A1 | | 9/2005 | Ito et al. | | |
| 2010/0049375 | A1 | | 2/2010 | Tanimoto | | |

FOREIGN PATENT DOCUMENTS

| CN | 101674965 | 3/2010 |
| JP | 04-248819 | 9/1995 |
| JP | 11-348696 | 12/1999 |
| JP | 2004-037220 | 2/2004 |
| JP | 2004-314692 | 11/2004 |
| JP | 2005-256636 | 9/2005 |
| JP | 2005-267108 | 9/2005 |
| JP | 2005-332192 | 12/2005 |
| JP | 2006-347508 | 12/2006 |
| JP | 2007-022117 | 2/2007 |
| JP | 2008-146515 | 6/2008 |

OTHER PUBLICATIONS

Extended Search Report dated Oct. 10, 2011 in corresponding European Application No. 09009937.5.
Office Action dated Jul. 16, 2010 in corresponding Japanese Application No. 2008-203410.
Office Action dated Mar. 17, 2011 in corresponding Chinese Application No. 200910161886.7.

* cited by examiner

*Primary Examiner* — Richard M. Camby
(74) *Attorney, Agent, or Firm* — Harness, Dickey & Pierce, PLC

(57) ABSTRACT

A travel support apparatus sets a travel locus of a vehicle based on a gaze point of a driver of the vehicle. By utilizing the gaze point, the travel locus is calculated and set for the travel control of the vehicle, especially for a curved portion of a road, in a matching manner that the calculated travel locus approximates the travel locus created by the steering operation of the driver. The above locus calculation scheme generates a natural travel locus because the driver of the vehicle usually gazes at an exit of the curved portion of the road when he/she steers the vehicle on the road. The natural travel locus calculated and set by the travel support apparatus prevents the driver from having discomfort and/or unsafe feeling while the travel of the vehicle is controlled by the apparatus.

11 Claims, 5 Drawing Sheets

APPARATUS FOR TRAVEL SUPPORT

CROSS REFERENCE TO RELATED APPLICATION

The present application is based on and claims the benefit of priority of Japanese Patent Application No. 2008-203410, filed on Aug. 6, 2008, the disclosure of which is incorporated herein by reference.

FIELD OF THE INVENTION

The present disclosure generally relates to a travel support apparatus that sets a travel locus of a movable body and provides a travel support for the movable body based on setting of the travel locus.

BACKGROUND INFORMATION

The method of setting a travel locus based on geometric information of a road and performing travel control of a movable body traveling on the road is, for example, disclosed in Japanese patent document JP-A-H07-248819. The travel locus control method in the above document is about a steer angle of a steering wheel based on a geometrically set locus and a direction of a vehicle relative to the geometrically set locus.

However, when the travel locus of the vehicle that is driven by a driver is set based on the geometric information, the travel locus does not necessarily match a predicted travel locus that provides comfort for the driver of the vehicle. That is, in other words, the travel locus according to the road geometry may lead to a discomfort of the driver when he/she performs the travel control of the vehicle.

More practically, if the driver is driving a vehicle and steering by him/herself, the vehicle is steered to travel toward an "exit" of a curved road when traveling on the curved road. On the other hand, when the vehicle is traveling on a travel locus that is being set according to the geometric information of the road, the vehicle is not sufficiently steered toward the "exit" of the curved road, thereby giving the driver an impression that the vehicle is going to go off from the road; which leads to discomfort and/or unsafe feeling of the driver.

SUMMARY OF THE INVENTION

In view of the above and other problems, the present invention provides a travel support apparatus that suitably supports a driver of a vehicle without causing discomfort of the driver.

In an aspect of the present disclosure, the travel support apparatus includes: a gaze point set unit for setting a gaze point of a driver of a movable body; and a trajectory set unit for setting a trajectory of the movable body based on the gaze point set by the gaze point set unit.

In general, when a movable body travels a curved road, the driver of the movable body performs steering operation while he/she is watching a so-called "exit" of a corner, that is, an end point of a curved portion of the road. In the present disclosure, a gaze point gazed at by the driver is set, and the travel locus is set based on the gaze point. Therefore, the set travel locus matches the travel locus generated by his/her own steering operations, and does not lead to the discomfort and/or unsafe feeling.

Further, according to another aspect of the present disclosure, the travel support apparatus includes: a position acquisition unit for acquiring, as environment information, a position of an object existing at a proximity of a movable body; a motion acquisition unit for acquiring, as motion information, a motion of the movable body; an observed motion calculation unit for calculating, based on a retina sphere model that models a retina of a driver of the movable body together with the environment information and motion information, observed motion representative of motion information of the object being projected onto the retina; and a trajectory set unit for setting a trajectory of the movable body based on the observed motion.

By having the above elements, the technique of the present disclosure calculates observed motion representative of motion information of an object that is projected on a retina sphere model of the driver. That is, the observed motion is defined as a translation of the motion of the object to a recognized amount of motion by the driver of the vehicle. Thus, by setting the travel locus of the vehicle based on the observed motion, the travel locus of the vehicle is prevented from causing the discomfort and/or unsafe feeling to the driver, due to the matching of the travel locus with the one from his/her own steering operation.

BRIEF DESCRIPTION OF THE DRAWINGS

Objects, features, and advantages of the present disclosure will become more apparent from the following detailed description made with reference to the accompanying drawings, in which.

DETAILED DESCRIPTION

Figure 1:
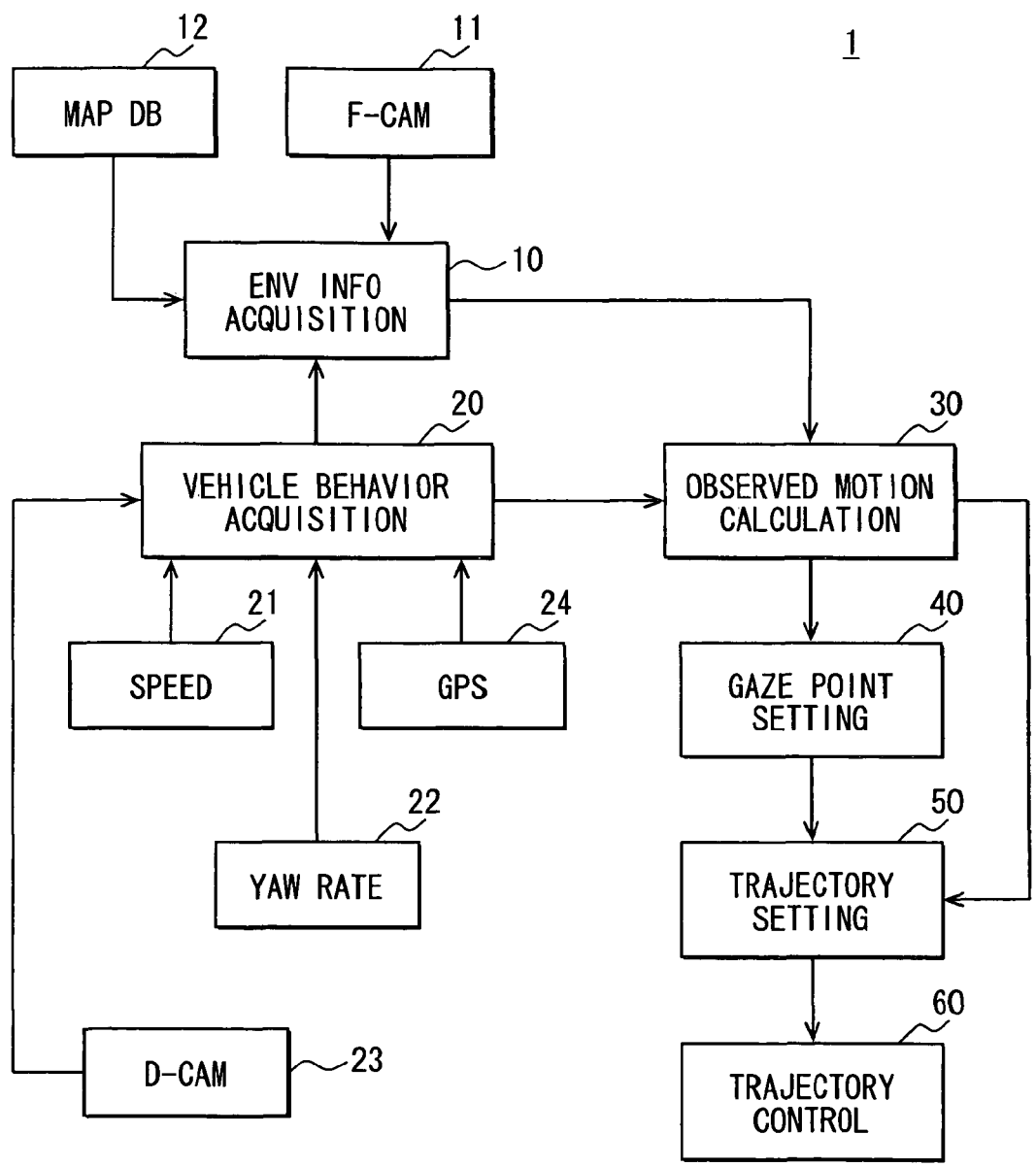
FIG. 1 is a block diagram of a structure of a travel support apparatus in an embodiment of the present invention.

The embodiment of the present disclosure is described with reference to the drawing. FIG. 1 is a block diagram of a structure of a travel support apparatus 1 in an embodiment of the present disclosure. The travel support apparatus 1 provides support for a travel of a four wheel vehicle (i.e., a movable object), and includes an environment information acquisition unit (i.e., a position acquisition unit in claim language) 10 for acquiring, as environment information, a position of an object existing at a proximity of the movable body; a vehicle behavior acquisition unit (i.e., a motion acquisition unit) 20 for acquiring, as motion information, a motion of the movable body; an observed motion calculation unit 30 for calculating, based on a retina sphere model that models a retina of a driver of the movable body together with the environment information and motion information, observed motion representative of motion information of the object being projected onto the retina; a gaze point set unit 40 for setting a gaze point of a driver of a movable body; a trajectory set unit 50 for setting a trajectory of the movable body based on the gaze point set by the gaze point set unit 40; and a trajectory control unit 60 for performing trajectory control of the movable body. Each of these elements is realized by a computer which is installed in the vehicle.

The environment information acquisition unit 10 acquires, as the environment information, (a) the position of an object existing around the vehicle and (b) the distance of the object from the vehicle. The object around the vehicle includes an object that is observed by the driver of the vehicle while the vehicle is traveling. In the present embodiment, the object around the vehicle includes grid points set on the road that is traveled by the vehicle. Therefore, the acquisition unit 10 acquires the position and distance of the grid points. Further, the object such as an obstacle on the road may be included in the object around the vehicle.

Figure 2:
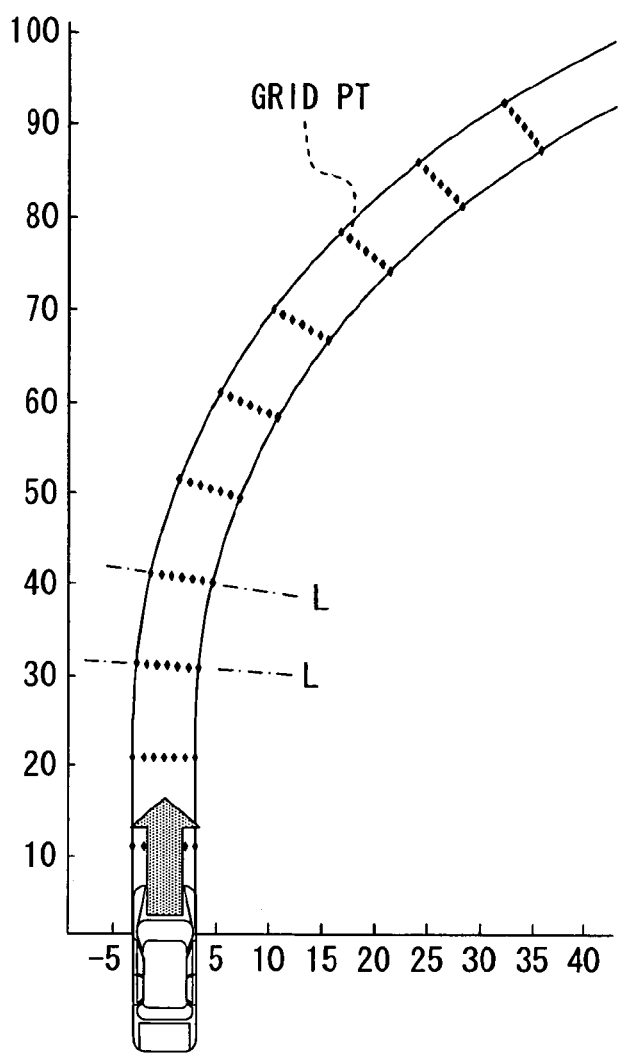
FIG. 2 is an illustration of grid points on a road.

The grid points on the traveled road are candidate points of vehicle's trajectory, that is, an expected travel locus of the vehicle. As illustrated in FIG. 2, the grid points are arranged along a grid line L on the traveled road in a manner that orthogonally crosses a center line of the road at even intervals. Further, the grid line L itself is drawn on the road at even intervals as shown in FIG. 2.

The position and the distance of the grid points are acquired by, for example, capturing an image of the road in front of the vehicle by a front camera 11 that is capable of continuously capturing a front image of the vehicle. Based on the analysis of the front image of the vehicle, the position and distance can be acquired. Further, instead of the front camera 11, a millimeter-wave radar or the like may be used. Furthermore, the position of the grid points relative to the vehicle may be acquired from a map database 12 that stores road map data. In this case, a current position of the vehicle may be determined in the first place. For the purpose of determining the current position of the vehicle, a map matching method that utilizes the map database 12 and a GPS unit 24 may be used. The current position of the vehicle may also be determined based on the combination of road map information, the front image of the vehicle and information from the radar or the like.

The vehicle behavior acquisition unit 20 acquires information on a motion of the vehicle. The vehicle motion information includes, a speed V, a yaw rate γ and the like, respectively calculated and acquired based on signals from a speed sensor 21 and a yaw rate sensor 22. Both of the speed V and the yaw rate γ, or at least one of the two values, may be acquired, based on the change of the current vehicle position detected by the GPS unit 24.

Further, the vehicle behavior acquisition unit 20 continuously calculates a change rate Θ of a head angle of the driver, in terms of an oscillating motion of the head of the driver, for example. That is, by employing a driver camera 23 in the vehicle, a face image of the driver is continuously captured and the head angle of the driver is continuously calculated based on the analysis of the face image. By further analyzing the head angle of the driver, the change rate Θ of the head angle can be calculated.

Figure 3:
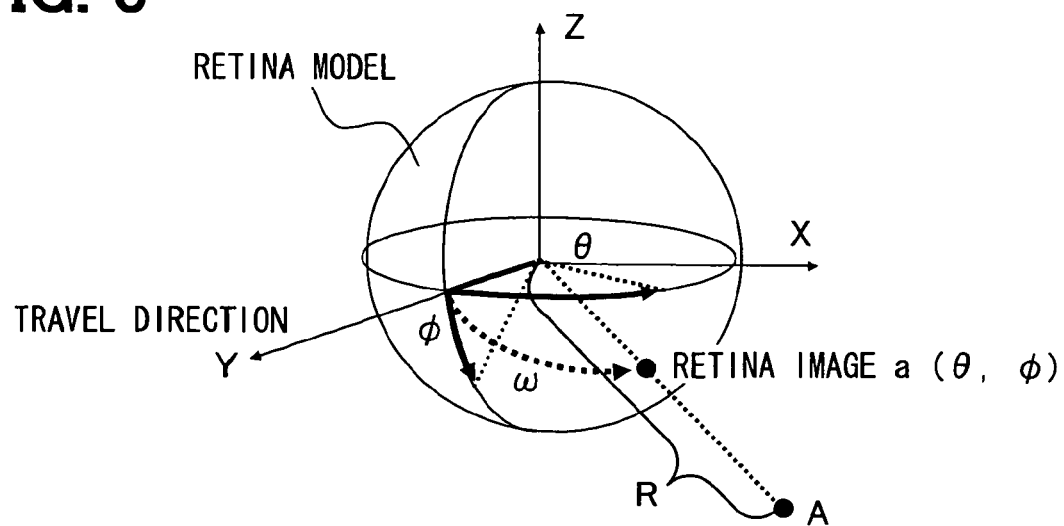
FIG. 3 is an illustration of a retina sphere model.

The observed motion calculation means 30 calculates an amount of motion of the object whose position and distance are calculated by the environment information acquisition unit 10 (designated as an observed motion hereinafter). More practically, the observed motion of the object being projected on a retina sphere model is calculated. FIG. 3 is an illustration of the retina sphere model that approximates a retina of the driver. On the retina sphere, the projected position of the object is represented by using a retina coordinate system.

The position of an image 'a' of an object A on the retina sphere model can be described by using a function (θ, φ) having an azimuth angle θ and an elevation angle φ as its parameters. Then, the observed motion calculation means 30 calculates, as the observed motion, an absolute change rate of eccentric angle ω. The absolute value of the change rate of the eccentric angle ω is represented by an equation 1 in the following. In the equation 1, the speed V of the vehicle, a distance R of the object A, as well as a yaw rate γ, the change rate Θ of the driver's head angle are used.

$$\omega = \frac{V}{R} \cdot \sqrt{1 - \cos^2\theta \cdot \cos^2\phi} + \frac{\sin\theta \cdot \cos\phi}{\sqrt{1 - \cos^2\theta \cdot \cos^2\phi}}(\gamma + \Theta) \quad \text{(Equation 1)}$$

The observed motion calculation means 30 thus continuously calculates the change rate of the eccentric angle of each of the grid points by using the equation 1. In this case, though the environment information acquisition unit 10 acquires the position of the object in an orthogonal coordinate system of (x, y, z), the position in the orthogonal coordinate system can be translated into the retina coordinate system (θ, φ) by using following equations 3 and 4. That is, the values of θ and φ can be calculated by the equations 3 and 4.

The change rate Θ of the eccentric angle is calculated by using the retina sphere model. Therefore, the visual sensation of the driver is reflected by the retina sphere model. That is, in other words, the observed motion calculation unit 30 translates the motion of the grid points on the road (e.g., translational motion and rotational motion) to the motion in the visual sensation of the driver.

The equation 1 in the above description is derived in the following manner. The eccentric angle ω is represented by using the azimuth angle θ and the elevation angle φ as shown in an equation 2. Further, if the orthogonal coordinate system is oriented with its Y axis aligned with the travel direction of the vehicle and with its origin having the same position as the retina coordinate system as shown in FIG. 3, the relationship between the angle θ, the angle φ, together with the eccentric angle ω in the retina coordinate system and the coordinates x, y, z in the orthogonal coordinate system is represented by the following equations 3 to 7.

$$\omega = \cos^{-1}(\cos\phi \cdot \cos\theta) \quad \text{(Equation 2)}$$

$$\theta = \tan^{-1}\left(\frac{x}{y}\right) \quad \text{(Equation 3)}$$

$$\phi = \tan^{-1}\left(\frac{z}{\sqrt{x^2 + y^2}}\right) \quad \text{(Equation 4)}$$

$$x = y \cdot \tan\theta \quad \text{(Equation 5)}$$

$$y = R \cdot \cos\omega \quad \text{(Equation 6)}$$

$$z = \sqrt{x^2 + y^2} \cdot \tan\phi \quad \text{(Equation 7)}$$

Further, when the formula shown as an equation 8 is employed to differentiate the equation 2, an equation 9 is derived.

$$(\cos^{-1} x)' = \frac{1}{\sqrt{1-x^2}} \quad \text{(Equation 8)}$$

$$\begin{aligned}\dot{\omega} &= \frac{1}{\sqrt{1-(\cos\theta\cdot\cos\phi)^2}} \cdot (-\sin\theta\cdot\cos\phi\cdot\dot\theta - \cos\theta\cdot\sin\phi\cdot\dot\phi) \\ &= \frac{-(\sin\theta\cdot\cos\phi)}{\sqrt{1-(\cos\theta\cdot\cos\phi)^2}} \cdot \dot\theta + \frac{-(\cos\theta\cdot\sin\phi)}{\sqrt{1-(\cos\theta\cdot\cos\phi)^2}} \cdot \dot\phi \\ &= \alpha(\theta,\phi)\cdot\dot\theta + \beta(\theta,\phi)\cdot\dot\phi\end{aligned} \quad \text{(Equation 9)}$$

When the vehicle speed V, the yaw rate γ, the change rate Θ of the driver's head angle are taken into consideration, the differentiated values of θ and φ are calculated, based on the equations 3 and 4, as equations 10 and 11.

$$\begin{aligned}\dot\phi &= \frac{1}{1+\left(\frac{z}{\sqrt{x^2+y^2}}\right)^2}\left(\frac{z}{\sqrt{x^2+y^2}}\right)' \\ &= \frac{x^2+y^2}{x^2+y^2+z^2}\left\{\frac{-z(x\dot x + y\dot y) + \dot z(x^2+y^2)}{(x^2+y^2)^{\frac{3}{2}}}\right\} \\ &= \frac{-zx\dot x}{(x^2+y^2+z^2)\sqrt{x^2+y^2}} \\ &= -\frac{R\sin\phi\cdot R\cos\phi\cos\theta\cdot V}{R^2 R\cos\phi} \\ &= -\frac{V}{R}\cos\theta\sin\phi\end{aligned} \quad \text{(Equation 10)}$$

$$\begin{aligned}\dot\theta &= \frac{1}{1+\left(\frac{y}{x}\right)^2}\left(\frac{y}{x}\right)' + \Theta + \gamma \\ &= \frac{-\dot x y + x\dot y}{x^2+y^2} + \Theta + \gamma \\ &= \frac{-VR\cos\phi\sin\theta}{R^2\cos^2\phi} + \Theta + \gamma \\ &= \frac{-V\cos\theta}{R\cos\phi} + \Theta + \gamma\end{aligned} \quad \text{(Equation 11)}$$

When the equations 10 and 11 are put in the equation 9, the equation 1 is derived.

The gaze point set unit 40 continuously sets the gaze point of the driver based on the change rate of the eccentric angle of each of the grid points calculated by the observed motion calculation unit 30. More practically, by finding the minimum value from among all of the absolute change rates of the eccentric angles, the grid point having the minimum value of the absolute change rate is set as the gaze point.

As mentioned above, the eccentric angle change rate represents the amount of motion in the visual sensation. Further, based on psychological theories and other findings as well as empirical knowledge, the driver is known to gaze at a point that least moves in his/her sight. Further, the driver is assumed to gaze at somewhere on the road while he/she is driving a vehicle. Therefore, the observed motion, that is, the amount of motion in the visual sensation, is, and should be, minimized at a certain point on the road in the sight of the driver where he/she is "gazing," that is, where his/her gaze stays. That is, using a point that has the minimum absolute change rate of the eccentric angle as the gaze point is a reasonable assumption.

Figure 4:
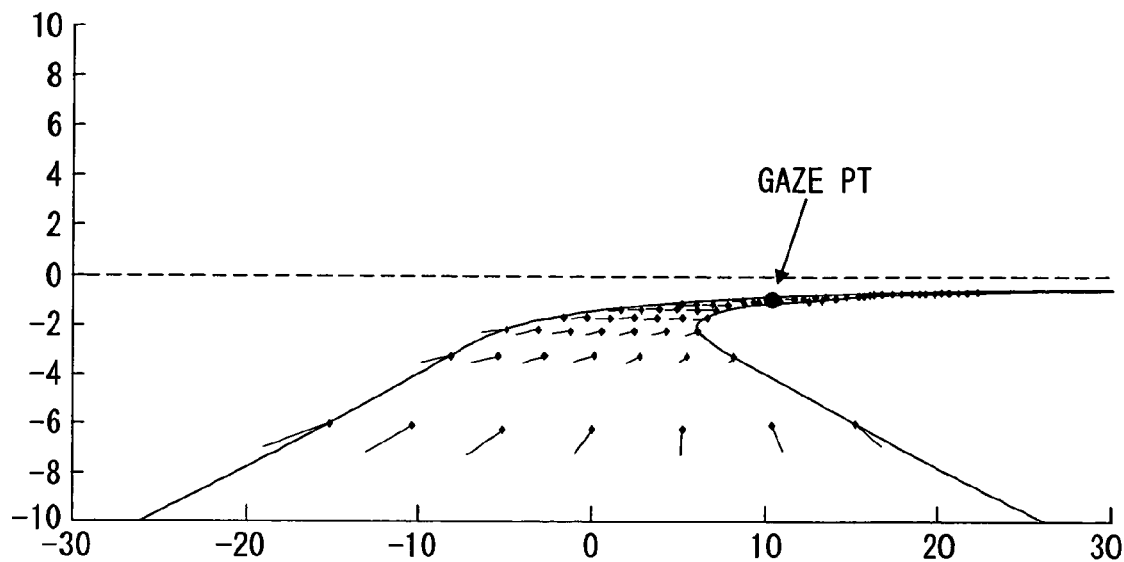
FIG. 4 is an illustration of eccentric angle variations calculated by a calculation unit and represented by a line segment for each of the grid points.

FIG. 4 is an illustration of the eccentric angle change rates of grid points, each of which represented by a segment having a proportional length. As shown in the illustration, the grid points in the lower portion (i.e., a near side relative to the vehicle) have larger change rates, and the grid points in the upper portion (i.e., a far side relative to the vehicle) have smaller change rates. The gaze point is set at a point in the upper right position, a so-called "exit" of the corner, or, the curved road.

Figure 5:
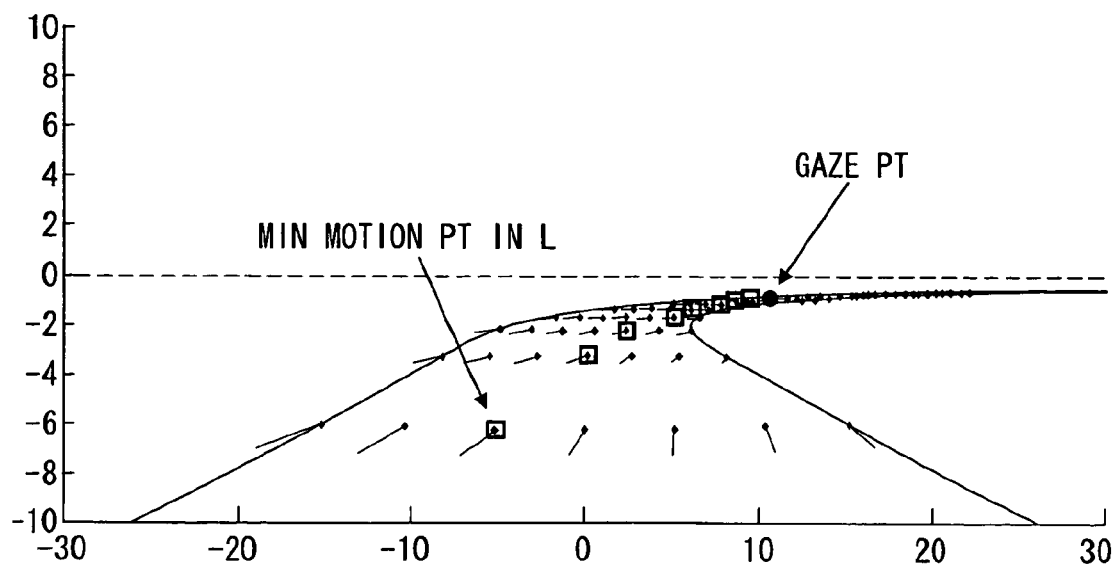
FIG. 5 is an illustration of a minimum variation point on each of the grid point lines and a gaze point.

The trajectory set unit 50 determines a grid point, in each of the grid lines, having the minimum eccentric angle change rate, in the absolute value. Then, by connecting the minimum change rate grid points and the gaze point set by the gaze point set unit 40, an expected travel locus of the vehicle, that is, a "trajectory" of the vehicle, is drawn. In FIG. 5, the grid points having the minimum change rate are represented by a figure of white square □ in the illustration, and the gaze point is represented by a figure of black circle ● in the illustration. The travel locus of the vehicle can be drawn by connecting those figures.

Figure 6:
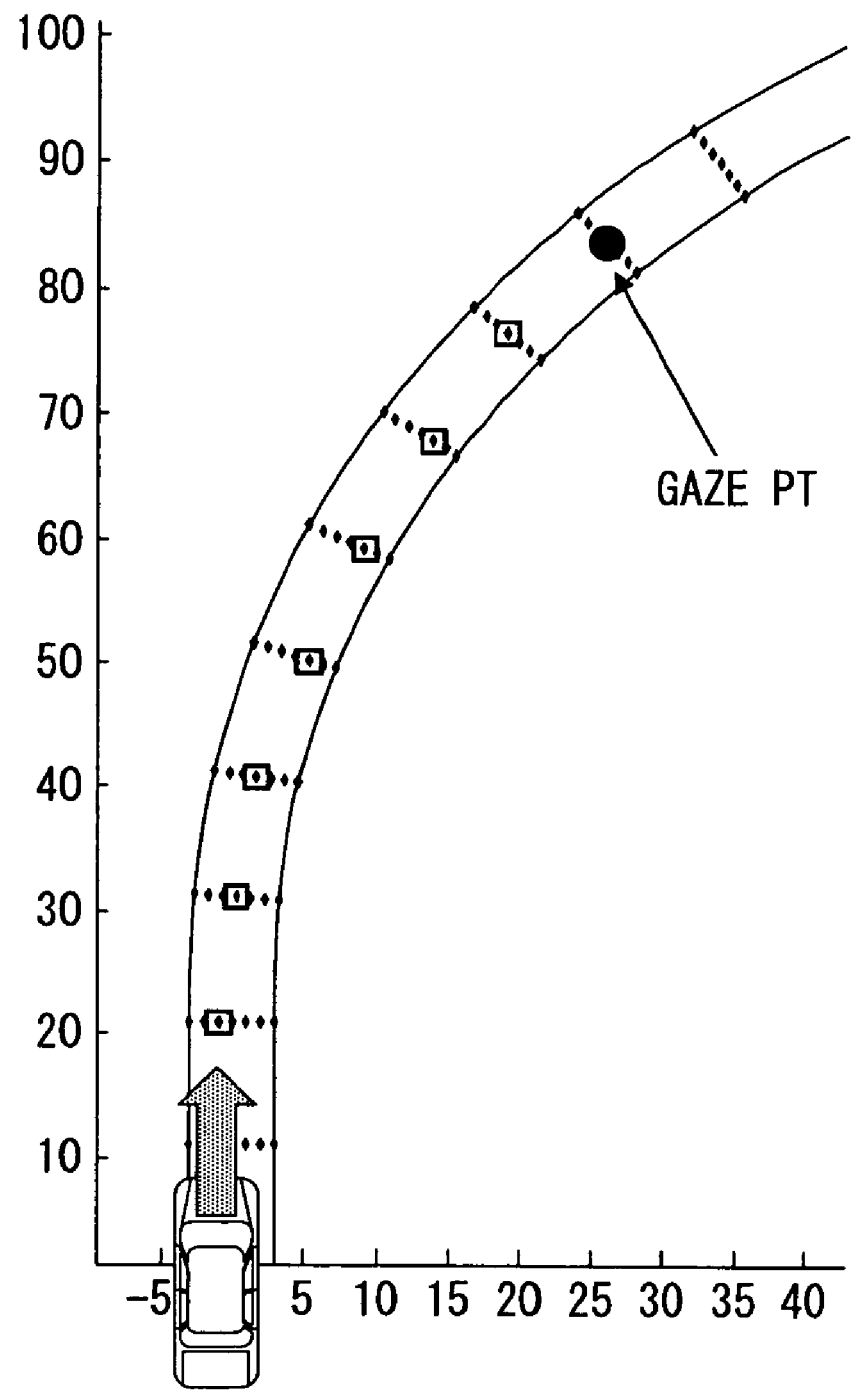
FIG. 6 is an illustration of a trajectory of a movable body converted to rectangular coordinates.

In this case, the change rate of the eccentric angle is originally calculated in the retina coordinate system, the change rate is translated to the orthogonal coordinate system for the purpose of plotting in the illustration by using the equations 5 to 7. FIG. 6 shows the trajectory after translation into the orthogonal coordinate system.

The trajectory control unit 60 sets, while defining a target trajectory being set by the trajectory set unit 50, a current trajectory based on the current travel condition of the vehicle. Then, based on the comparison between the current trajectory and the target trajectory, the control unit 60 controls the trajectory of the vehicle so that the current trajectory approximates the target trajectory.

The current trajectory is set based on a current steering angle of the steering wheel as well as the yaw rate and the like, that is, based on the condition representing the current steering condition of the vehicle, assuming that the current steering condition is kept intact for the time being. Alternatively, the current trajectory may be set as an extension of the preceding trajectory. The trajectory control is performed by changing the steering characteristics of the vehicle. The trajectory control may be performed by assisting the steering operation of the steering wheel.

Figure 7A:
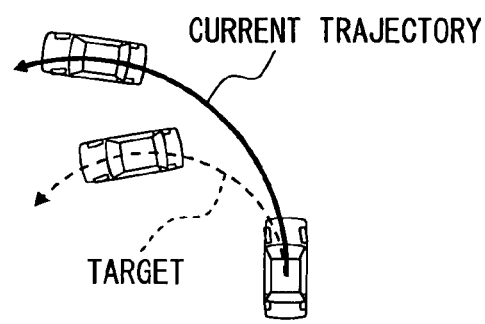
FIGS. 7A and 7B are illustrations of discrepancy between a target trajectory and a current trajectory.
Figure 7B:
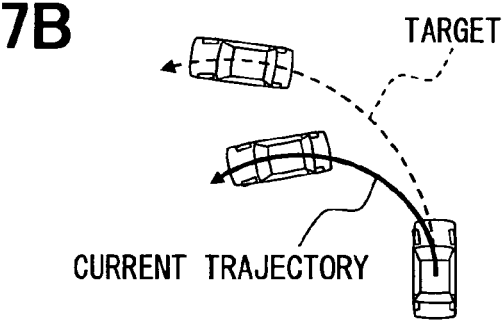

The steering characteristics can be changed by changing the front-rear load balance of the vehicle. The load balance may be shifted frontward for the improved steering characteristics. Therefore, as shown in FIG. 7A, the curvature radius of the current trajectory being greater than the target trajectory may be adjusted by shifting the load toward the front of the vehicle. On the other hand, if the load balance is shifted backward, the stability of the vehicle is improved. That is, as shown in FIG. 7B, the curvature radius of the current trajectory being smaller than the target trajectory may be adjusted by shifting the load toward the rear of the vehicle. Further, the load balance may be shifted by other methods well-known in the art. That is, for example, the load balance may be shifted by controlling the driving force and the braking force, or by managing stability factors or the like.

Further, when the steering operation is assisted, the vehicle behavior is predicted based on the current trajectory, with the yaw rate and the steering assist torque carefully under control for realizing the target trajectory and matching of the predicted vehicle behavior with the one on the target trajectory.

As stated above in detail, the observed motion of the object is calculated as the change rate of the eccentric angle of the observed object projected on the retina sphere model in the present embodiment. Therefore, the actually gazed point on the road is accurately approximated by the gaze point set by the gaze point set unit. The reason for achieving the accuracy of the approximation is that the amount of the observed motion of the object is translated to the amount of measurement in the visual sensation physically modeled according to a body structure of the driver.

Then, the travel locus of the vehicle, or the trajectory, is set according to the gaze point calculated in the above-described manner. Therefore, the trajectory realized by the travel support apparatus is sufficiently close to the trajectory that is realized by the self-steering of the driver. As a result, the driver of the vehicle is prevented from having discomfort or unsafe feeling when the trajectory control is performed by using the target trajectory set in the above-described manner.

Although the present disclosure has been fully described in connection with preferred embodiment thereof with reference to the accompanying drawings, it is to be noted that various changes and modifications will become apparent to those skilled in the art.

For example, the gaze point is calculated based on the change rate of the eccentric angle in the above embodiment. However, the gaze point may be calculated based on the face image captured by the driver camera 23 and the analysis of the face image in terms of the position of the iris of the eye.

Further, the motion of the object is represented as a vector in the image captured by the camera 11, that is, the motion is calculated as an optical flow, and the gaze point of the driver may be set at the minimum optical flow point. In this case, the optical flow may only be calculated for the points on the road as is the case in the above embodiment.

Furthermore, the following scheme may be used for the pre-calculation of the gaze point. That is, the navigation system usually predicts the vehicle speed V in the course of calculation of the guidance route. Therefore, the predicted vehicle speed V is used together with the road shape stored in the navigation system and the yaw rate derived therefrom for the calculation of the change rate of the eccentric angle in the equation 1. In this case, the change rate $\Theta$ of the head angle of the driver may be predictably calculated based on an assumption that the driver's head angle is identical with the traveling direction of the vehicle, or on an assumption that the driver's head angle is directed toward a point ahead on the guidance route. Likewise, the change rate of the eccentric angle of each of the grid points may be calculated in a predictable manner, and the predicted change rate may be used to calculate the trajectory of the vehicle. Further, the driver's head angle as well as the change rate $\Theta$ of the head angle may be calculated when the trajectory of the vehicle is calculated during the travel of the vehicle. Furthermore, the gaze point as well as the change rate of the eccentric angle of the vehicle may be calculated based on information derived from an external information provider.

Figure 8:
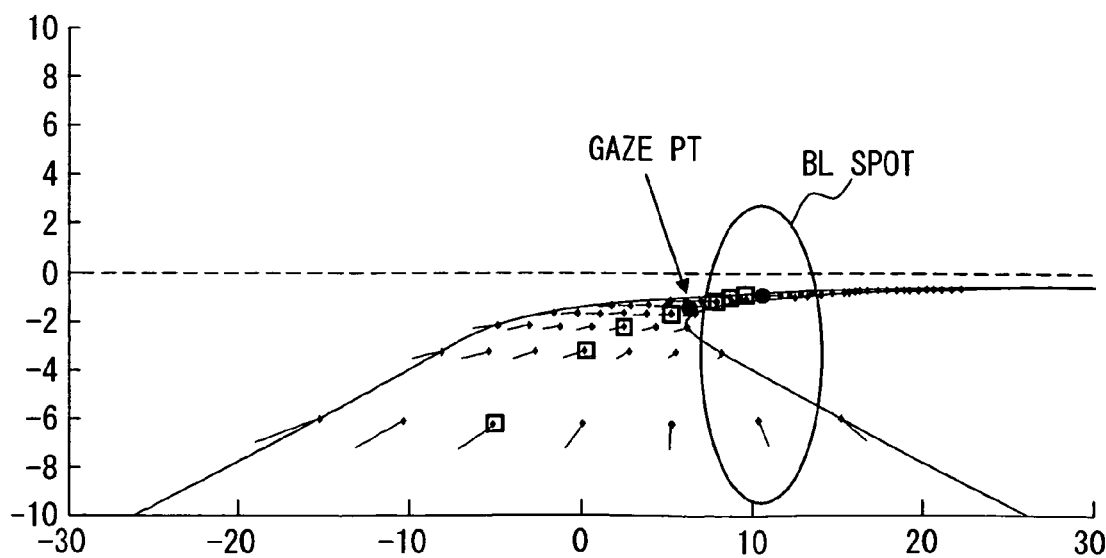
FIG. 8 is an illustration of a blind spot in association with the gaze point and the trajectory.

Furthermore, the blind spot in the retina of the driver may be considered when calculating the gaze point and the trajectory. That is, for example, if the driver has a blind spot that can be mapped in his/her sight as shown in FIG. 8, the minimum change rate of the eccentric angle in the absolute value is searched for in a blind-spot-excluded area in the sight of the driver. In the illustration in FIG. 8, a new gaze point is found in the blind-spot-excluded area that is outside of the mapping of the blind spot of the driver. Further, in each of the grid lines, the grid point having the minimum eccentric angle change rate is searched for by excluding, from the search area, an area that corresponds to the blind spot of the driver. The exclusion of the blind spot may be based on a position of the blind spot that is input by the driver him/herself.

Furthermore, in the above embodiment, the trajectory control is performed based on the comparison between the target trajectory and the current trajectory. However, the consciousness determination may be performed based on the comparison of the trajectories. The consciousness determination may be performed by determining that, when the difference between the target trajectory and the current trajectory is large, the degree of consciousness is low, for example. Further, if the degree of consciousness is low, the driver of the vehicle may be warned.

Furthermore, the target trajectory may simply be displayed on a display unit such as a headup display or the like, without performing the trajectory control and determining the consciousness.

Furthermore, the trajectory may be set based on the vehicle position and the gaze point without calculating the trajectory candidate points on the grid lines, instead of calculating the eccentric angle change rate for all of the grid points on the grid lines as described in the above embodiment. That is, only by determining the vehicle position and the gaze point, the trajectory of the vehicle can be drawn based on the curvature radius according to the curvature of the road (e.g., according to the curvature of a center line of the road), for example, without calculating the change rate of the eccentric angle of each of the grid points on the grid lines. To the contrary, the trajectory of the vehicle may be determined only by calculating the change rate of the eccentric angle of the grid points without setting the gaze point. That is, only by setting "trajectory points" on the grid lines based on the eccentric angle change rates, the trajectory of the vehicle can be set.

Furthermore, in the above embodiment, the automotive vehicle is used as an example of implementation object of the present disclosure. However, other type of vehicles such as an aircraft, a motorcycle, a wheelchair and the like may also be considered as the implementation object of the present disclosure.

Such changes, modifications, and summarized scheme are to be understood as being within the scope of the present disclosure as defined by appended claims.

What is claimed is:
1. A travel support apparatus comprising:
a gaze point set unit for setting a gaze point of a driver of a movable body;
a trajectory set unit for setting a trajectory of the movable body based on the gaze point set by the gaze point set unit;
a position acquisition unit for acquiring, as environment information, a position of an object existing at a proximity of the movable body;
a motion acquisition unit for acquiring, as motion information, a motion of the movable body; and
an observed motion calculation unit for calculating, based on a retina sphere model that models a retina of a driver of the movable body together with the environment information and motion information, observed motion representative of motion information of the object in the retina coordinate system for the purpose of quantification of a vision of the driver of the movable body, wherein
the movable body travel on a road,
the observed motion calculation unit calculates the observed motion, for each of multiple grid points, by drawing grid lines on the traveled road orthogonally in a crossing manner at preset intervals, the grid lines formed by the multiple grid points respectively serving as trajectory candidate points, and the trajectory set unit connects the gaze point and minimum motion grid points that are determined, on each of the grid lines, to have minimum observed motion to set the trajectory of the movable body.

2. The travel support apparatus of claim 1, wherein
the gaze point set unit sets the gaze point of the driver based on the environment information acquired by the position information unit and the motion information of the movable body acquired by the motion acquisition unit.

3. The travel support apparatus of claim 2, wherein
the gaze point set unit sets the gaze point of the driver based on the observed motion calculated by the observed motion calculation unit.

4. The travel support apparatus of claim 3, wherein
the observed motion calculation unit calculates observed motions of multiple points on the road traveled by the movable body, and
the gaze point set unit sets, as the gaze point, a minimum motion point that minimizes the observed motion from among the multiple points on the road.

5. The travel support apparatus of claim 1, wherein
a driver camera for capturing the driver of the movable body is included to capture a driver image of the driver that at least includes an image of an eye of the driver, and
the gaze point set unit sets the gaze point by analyzing the driver image captured by the driver camera.

6. The travel support apparatus of claim 1, wherein
a front camera for capturing a front image in a travel direction of the movable body is disposed on the movable body, and
the gaze point set unit sets the gaze point based on an optical flow in the front image captured by the front camera.

7. The travel support apparatus of claim 1 further comprising a trajectory control unit for performing trajectory control of the movable body by comparing a target trajectory of the movable body set by the trajectory set unit with a current trajectory calculated based on a current condition of the movable body.

8. The travel support apparatus of claim 7, wherein
the movable body has a front wheel and a rear wheel, and
the trajectory control unit shifts a load balance between the front wheel and the rear wheel for performing the trajectory control of the movable body.

9. The travel support apparatus of claim 7, wherein
the trajectory control unit changes a steering assist torque for performing the trajectory control.

10. The travel support apparatus of claim 1 further comprising a consciousness determination unit is provided so as to perform consciousness determination of the driver of the movable body by comparing a target trajectory of the movable body set by the trajectory set unit and a current trajectory calculated based on a current condition of the movable body.

11. A travel support apparatus comprising:
a gaze point set unit for setting a gaze point of a driver of a movable body;
a trajectory set unit for setting a trajectory of the movable body based on the gaze point set by the gaze point set unit;
a trajectory control unit for performing trajectory control of the movable body by comparing a target trajectory of the movable body set by the trajectory set unit with a current trajectory calculated based on a current condition of the movable body; wherein
the movable body has a front wheel and a rear wheel, and
the trajectory control unit shifts a load balance between the front wheel and the rear wheel for performing the trajectory control of the movable body.

* * * * *